(12) United States Patent
Nishimura et al.

(10) Patent No.: US 11,196,352 B2
(45) Date of Patent: Dec. 7, 2021

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Kazuki Nishimura, Chuo-ku (JP); Toshihide Nakano, Chuo-ku (JP)

(73) Assignee: TOSHIBA MITSUBISHI-ELECTRIC INDUSTRIAL SYSTEMS CORPORATION, Chuo-ku (JP)

(\*) Notice: Subject to any disclaimer, the term of this patent is extended or adjusted under 35 U.S.C. 154(b) by 0 days.

(21) Appl. No.: 16/755,762

(22) PCT Filed: Oct. 25, 2017

(86) PCT No.: PCT/JP2017/038487
§ 371 (c)(1),
(2) Date: Apr. 13, 2020

(87) PCT Pub. No.: WO2019/082297
PCT Pub. Date: May 2, 2019

(65) Prior Publication Data
US 2020/0280265 A1    Sep. 3, 2020

(51) Int. Cl.
*H02H 7/12* (2006.01)
*H02M 7/217* (2006.01)
(Continued)

(52) U.S. Cl.
CPC ........ *H02M 5/4585* (2013.01); *H02H 7/1216* (2013.01); *H02M 7/217* (2013.01); *H02M 7/487* (2013.01); *H02M 7/537* (2013.01)

(58) Field of Classification Search
CPC .. H02H 7/1216; H02M 5/4585; H02M 7/217; H02M 7/487; H02M 7/537
See application file for complete search history.

(56) References Cited

U.S. PATENT DOCUMENTS 7,960,939 B2 \* 6/2011 Steimer ................... B60L 50/13
                                                            318/803
8,188,694 B2 \* 5/2012 Tallam ................ H02M 5/4585
                                                          318/400.3
(Continued)

FOREIGN PATENT DOCUMENTS

EP           3 644 489 A1    4/2020
WO    WO 2010/095241 A1    8/2010
(Continued)

OTHER PUBLICATIONS

International Search Report dated Nov. 21, 2017 in PCT/JP2017/038487 filed Oct. 25, 2017, 2 pages.
(Continued)

*Primary Examiner* — Gary L Laxton
(74) *Attorney, Agent, or Firm* — Oblon, McClelland, Maier & Neustadt, L.L.P.

(57) ABSTRACT

A power conversion device includes a converter, a first capacitor, and a second capacitor. The first capacitor is connected between a DC positive bus and a DC neutral point bus. The second capacitor is connected between the DC neutral point bus and a DC negative bus. The converter includes a diode rectifier connected between an AC power supply and each of the DC positive bus and the DC negative bus, and a first AC switch electrically connected between the AC power supply and the DC neutral point bus. The power conversion device further includes a first fuse electrically connected between the first AC switch and a connection point between the first and second capacitors.

8 Claims, 12 Drawing Sheets

(51) Int. Cl.
*H02M 5/458* (2006.01)
*H02M 7/487* (2007.01)
*H02M 7/537* (2006.01)

(56) References Cited

U.S. PATENT DOCUMENTS

| | | | |
|---|---|---|---|
| 8,208,276 B2 * | 6/2012 | Sato | H02M 7/487 363/131 |
| 10,050,469 B2 | 8/2018 | Nishimura et al. | |
| 10,644,610 B2 * | 5/2020 | Nishimura | H02M 7/48 |
| 2004/0223346 A1 * | 11/2004 | Rayner | H02M 5/458 363/37 |
| 2011/0019452 A1 | 1/2011 | Shinomoto et al. | |
| 2011/0051478 A1 | 3/2011 | Sato et al. | |
| 2017/0012549 A1 * | 1/2017 | Abe | H02M 5/458 |

FOREIGN PATENT DOCUMENTS

WO    WO 2016/157468 A1    10/2016
WO    WO 2017/056209 A1    4/2017

OTHER PUBLICATIONS

Office Action dated Dec. 21, 2020 in corresponding Indian Patent Application No. 202017019187 (with English Translation), 5 pages.
Supplementary European Search Report dated May 6, 2021, in European Patent Application No. EP 17 92 9878.

* cited by examiner

POWER CONVERSION DEVICE

TECHNICAL FIELD

The present invention relates to a power conversion device.

BACKGROUND ART

A power conversion device applied to an uninterruptible power supply device and the like generally includes a converter for converting alternating current (AC) power from a commercial AC power supply into direct current (DC) power, and an inverter for converting the DC power into AC power having desired frequency and voltage.

For example, WO 2010/095241 (PTL 1) discloses an uninterruptible power supply device constituted of a power conversion device including a three-level converter and a three-level inverter. In the power conversion device, each of the three-level converter and the three-level inverter includes a plurality of semiconductor switching elements.

In the power conversion device described above, an overcurrent or an overvoltage may occur when any of the plurality of semiconductor switching elements is damaged and is short-circuited. Thus, in PTL 1, a fuse is connected between one terminal of each semiconductor switching element and a DC bus (a DC positive bus, a DC negative bus, or DC neutral point bus). With such a configuration, when any of the plurality of semiconductor switching elements is short-circuited, a fuse is blown and a path through which a current flows is cut off, and thereby occurrence of an overcurrent or an overvoltage can be prevented.

CITATION LIST

Patent Literature

PTL 1: WO 2010/095241

SUMMARY OF INVENTION

Technical Problem

In the power conversion device described in PTL 1, each of the three-level converter and the three-level inverter has a first fuse connected between a first semiconductor switching element and the DC positive bus, a second fuse connected between a second semiconductor switching element and the DC negative bus, and a third fuse connected between an AC switch and the DC neutral point bus. That is, a fuse is provided in a current path between one terminal of each semiconductor switching element and each DC bus. This may lead to an increase in the number of fuses used. It should be noted that PTL 1 describes a configuration that nine fuses are used for the three-level converter and another nine fuses are used for the three-level inverter. Such an increased number of fuses may lead to an increase in the size and cost of the power conversion device.

Further, in PTL 1, since the power conversion device includes many fuses, the total power losses occurring in all the fuses increase during operation of the power conversion device, which may result in a reduction in the efficiency of the power conversion device.

Accordingly, an object of the present invention is to provide a power conversion device capable of achieving prevention of an overcurrent and an overvoltage with a simple configuration.

Solution to Problem

A power conversion device in accordance with the present invention includes a DC positive bus, a DC negative bus, and a DC neutral point bus, a converter, a first capacitor, and a second capacitor. The converter is connected between an AC power supply and each of the DC positive bus, the DC negative bus, and the DC neutral point bus, and converts an AC voltage supplied from the AC power supply into a DC voltage. The first capacitor is connected between the DC positive bus and the DC neutral point bus. The second capacitor is connected between the DC neutral point bus and the DC negative bus. The converter includes a diode rectifier connected between the AC power supply and each of the DC positive bus and the DC negative bus, and a first AC switch electrically connected between the AC power supply and the DC neutral point bus. The power conversion device further includes a first fuse electrically connected between the first AC switch and the DC neutral point bus.

Advantageous Effects of Invention

According to the present invention, a power conversion device capable of achieving prevention of an overcurrent and an overvoltage with a simple configuration can be provided.

BRIEF DESCRIPTION OF DRAWINGS

FIG. 5 is a diagram showing a case where IGBT element Q1R has a failure and is short-circuited during a period in which an IGBT element Q1S is turned on.

FIG. 7 is a diagram showing a case where IGBT element Q4U has a failure and is short-circuited during a period in which IGBT elements Q1U and Q3V are turned on.

FIG. 8 is a diagram showing a case where IGBT element Q3U has a failure and is short-circuited during a period in which IGBT elements Q2U and Q4V are turned on.

DESCRIPTION OF EMBODIMENTS

Figure 1:
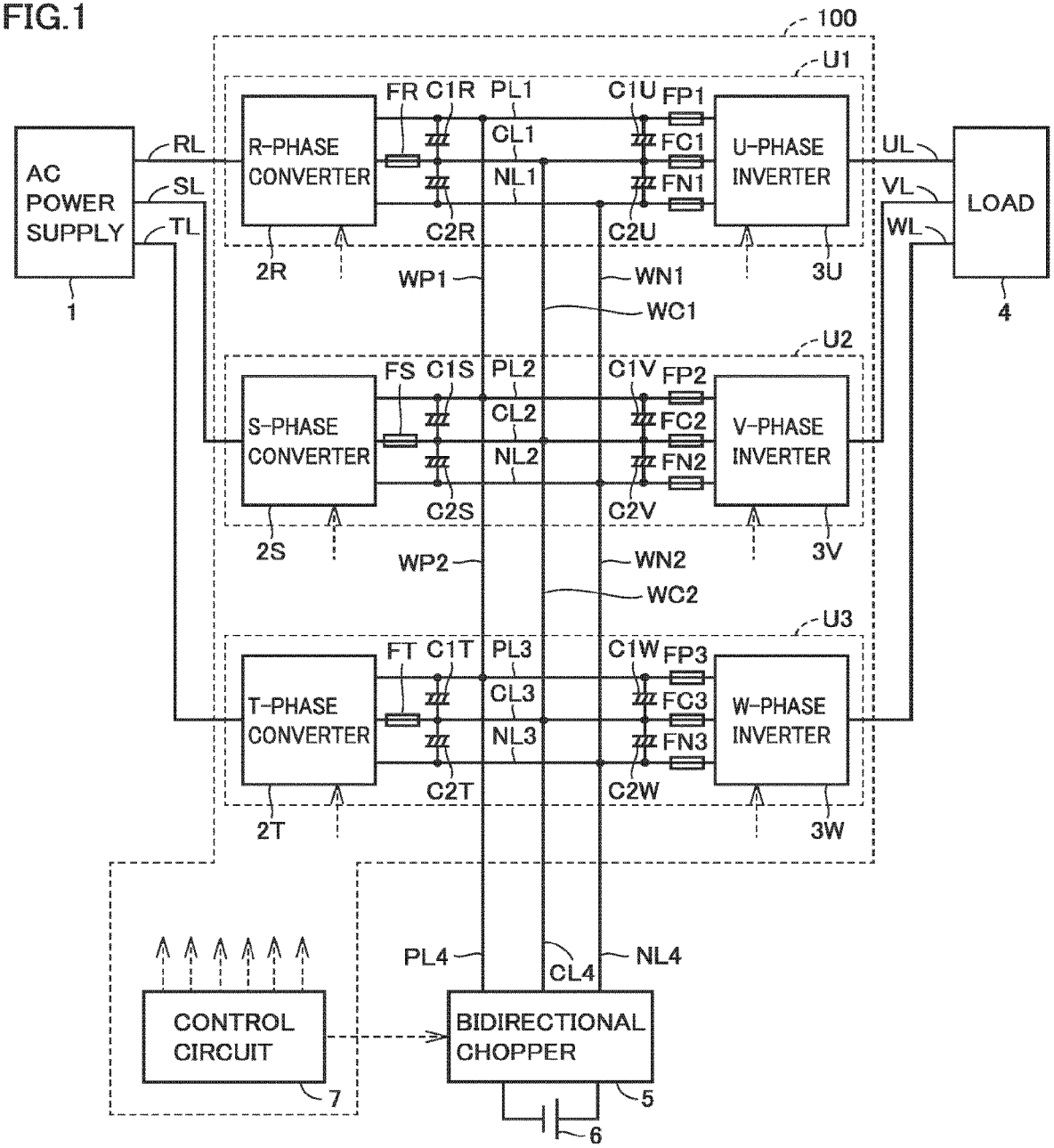
FIG. 1 is a schematic block diagram showing a main circuit configuration of a power conversion device 100 in accordance with an embodiment of the present invention.

Hereinafter, an embodiment of the present invention will be described in detail with reference to the drawings. It should be noted that identical or corresponding parts in the drawings will be designated by the same reference characters, and the description thereof will not be repeated in principle.

FIG. 1 is a schematic block diagram showing a main circuit configuration of a power conversion device 100 in accordance with the embodiment of the present invention. Power conversion device 100 in accordance with the embodiment of the present invention is applied, for example, to an uninterruptible power supply device. An AC power supply 1 supplies three-phase AC power having a commercial frequency to power conversion device 100. A load 4 is driven by three-phase AC power having the commercial frequency supplied from power conversion device 100.

Referring to FIG. 1, power conversion device 100 includes three converter units U1 to U3 connected in parallel between AC power supply 1 and load 4. Power conversion device 100 further includes wires WP1, WP2, WN1, WN2, WC1, and WC2, and a control circuit 7. Power conversion device 100 constitutes an uninterruptible power supply device, by being connected with a DC positive bus PL4, a DC negative bus NL4, a DC neutral point bus CL4, a bidirectional chopper 5, and a DC power supply 6.

First converter unit U1 includes an R-phase converter 2R, a U-phase inverter 3U, a DC positive bus PL1, a DC negative bus NL1, a DC neutral point bus CL1, and capacitors C1R, C2R, C1U, and C2U.

To R-phase converter 2R, an R-phase voltage VR is supplied from AC power supply 1 through an R-phase line RL. R-phase converter 2R converts R-phase voltage VR into a DC voltage, and supplies the DC voltage to U-phase inverter 3U through DC buses PL1, CL1, NL1. U-phase inverter 3U converts the DC voltage from R-phase converter 2R into a U-phase voltage VU. U-phase voltage VU generated by U-phase inverter 3U is supplied to load 4 through a U-phase line UL. Capacitors C1R (a first capacitor) and C1U (a third capacitor) are connected in parallel between DC positive bus PL1 and DC neutral point bus CL1. Capacitors C2R (a second capacitor) and C2U (a fourth capacitor) are connected in parallel between DC neutral point bus CL1 and DC negative bus NL1.

Second converter unit U2 includes an S-phase converter 2S, a V-phase inverter 3V, a DC positive bus PL2, a DC negative bus NL2, a DC neutral point bus CL2, and capacitors C1S, C2S, C1V, and C2V.

To S-phase converter 2S, an S-phase voltage VS is supplied from AC power supply 1 through an S-phase line SL. S-phase converter 2S converts S-phase voltage VS into a DC voltage, and supplies the DC voltage to V-phase inverter 3V through DC buses PL2, CL2, NL2. V-phase inverter 3V converts the DC voltage from S-phase converter 2S into a V-phase voltage VV. V-phase voltage VV generated by V-phase inverter 3V is supplied to load 4 through a V-phase line VL. Capacitors C1S (a first capacitor) and C1V (a third capacitor) are connected in parallel between DC positive bus PL2 and DC neutral point bus CL2. Capacitor C2S (a second capacitor) and C2V (a fourth capacitor) are connected in parallel between DC neutral point bus CL2 and DC negative bus NL2.

Third converter unit U3 includes a T-phase converter 2T, a W-phase inverter 3W, a DC positive bus PL3, a DC negative bus NL3, a DC neutral point bus CL3, and capacitors C1T, C2T, C1W, and C2W.

To T-phase converter 2T, a T-phase voltage VT is supplied from AC power supply 1 through a T-phase line TL. T-phase converter 2T converts T-phase voltage VT into a DC voltage, and supplies the DC voltage to W-phase inverter 3W through DC buses PL3, CL3, NL3. W-phase inverter 3W converts the DC voltage from T-phase converter 2T into a W-phase voltage VW. W-phase voltage VW generated by W-phase inverter 3W is supplied to load 4 through a W-phase line WL. Capacitors C1T (a first capacitor) and C1W (a third capacitor) are connected in parallel between DC positive bus PL3 and DC neutral point bus CL3. Capacitors C2T (a second capacitor) and C2W (a fourth capacitor) are connected in parallel between DC neutral point bus CL3 and DC negative bus NL3.

In this manner, each of converter units U1 to U3 is configured to include one single-phase converter, one single-phase inverter, three DC buses (a DC positive bus, a DC negative bus, a DC neutral point bus), and four capacitors.

Wires WP1, WN1, and WC1 are provided between first converter unit U1 and second converter unit U2. Specifically, wire WP1 is connected between DC positive buses PL1 and PL2. Wire WN1 is connected between DC negative buses NL1 and NL2. Wire WC1 is connected between DC neutral point buses CL1 and CL2.

Wires WP2, WN2, and WC2 are provided between second converter unit U2 and third converter unit U3. Specifically, wire WP2 is connected between DC positive buses PL2 and PL3. Wire WN2 is connected between DC negative buses NL2 and NL3. Wire WC2 is connected between DC neutral point buses CL2 and CL3.

DC positive bus PL4, DC negative bus NL4, and DC neutral point bus CL4 are provided between third converter unit U3 and bidirectional chopper 5. Specifically, DC positive bus PL4, DC negative bus NL4, and DC neutral point bus CL4 are connected between bidirectional chopper 5 and DC positive bus PL3, DC negative bus NL3, and DC neutral point bus CL3, respectively.

Bidirectional chopper 5 is connected between DC power supply 6 and each of DC positive bus PL4, DC negative bus NL4, and DC neutral point bus CL4. Bidirectional chopper 5 is configured to perform bidirectional DC voltage conversion between DC power supply 6 and each of DC buses PL4, NL4, and CL4.

DC positive buses PL1, PL2, and PL3 are connected with each other through wires WP1 and WP2. Thereby, voltages of DC positive buses PL1, PL2, and PL3 can be matched.

Further, DC negative buses NL1, NL2, and NL3 are connected with each other through wires WN1 and WN2. Thereby, voltages of DC negative buses NL1, NL2, and NL3 can be matched.

Furthermore, DC neutral point buses CL1, CL2, and CL3 are connected with each other through wires WC1 and WC2. Thereby, voltages of DC neutral point buses CL1, CL2, and CL3 can be matched.

With such a configuration, input voltages of single-phase inverters 3U, 3V, and 3W of converter units U1 to U3 can be matched. Therefore, amplitudes of the phase voltages output from single-phase inverters 3U, 3V, and 3W can be matched.

Next, operation of power conversion device 100 in accordance with the present embodiment will be described.

The three-phase AC power from AC power supply 1 is supplied to R-phase converter 2R, S-phase converter 2S, and T-phase converter 2T, through R-phase line RL, S-phase line SL, and T-phase line TL, respectively. R-phase converter 2R, S-phase converter 2S, and T-phase converter 2T constitute a three-phase converter. The three-phase converter converts the three-phase AC power supplied from AC power supply 1 into DC power, and supplies the DC power to U-phase inverter 3U, V-phase inverter 3V, and W-phase inverter 3W, through the DC positive buses, the DC negative buses, and the DC neutral point buses.

U-phase inverter 3U, V-phase inverter 3V, and W-phase inverter 3W constitute a three-phase inverter. The three-phase inverter converts the DC power supplied through the DC positive buses, the DC negative buses, and the DC neutral point buses into three-phase AC power. The three-phase AC power generated by the three-phase inverter is supplied to load 4 through U-phase line UL, V-phase line VL, and W-phase line WL.

During a normal state in which the three-phase AC power is supplied from AC power supply 1, bidirectional chopper 5 charges DC power supply 6 by stepping down each of a DC voltage between DC buses PL4 and CL4 and a DC voltage between DC buses CL4 and NL4 and supplying them to DC power supply 6. During a power failure in which supply of a three-phase AC voltage from AC power supply 1 is cut off, bidirectional chopper 5 discharges DC power supply 6 by stepping up a voltage between terminals of DC power supply 6 and supplying it to each of between DC buses PL4 and CL4 and between DC buses CL4 and NL4.

Control circuit 7 controls operations of the three-phase converter (single-phase converters 2R, 2S, and 2T), the three-phase inverter (single-phase inverters 3U, 3V, and 3W), and bidirectional chopper 5, based on the three-phase AC voltage supplied from AC power supply 1, a DC voltage of each of DC buses PL4, NL4, and CL4, the voltage between the terminals of DC power supply 6, a three-phase AC voltage output from the three-phase inverter (single-phase inverters 3U, 3V, and 3W), a three-phase AC current flowing to load 4 (a load current), and the like.

Power conversion device 100 further includes fuses FR, FS, FT, FP1, FP2, FP3, FN1, FN2, FN3, FC1, FC2, and FC3.

Fuse FR is electrically connected between R-phase converter 2R and DC neutral point bus CL1. Specifically, fuse FR has one terminal connected to a DC terminal of R-phase converter 2R, and the other terminal connected to a connection point between capacitors C1R and C2R. Fuse FR is blown when an overcurrent flows between R-phase line RL and DC neutral point bus CL1. Fuse FS is electrically connected between S-phase converter 2S and DC neutral point bus CL2. Specifically, fuse FS has one terminal connected to a DC terminal of S-phase converter 2S, and the other terminal connected to a connection point between capacitors C1S and C2S. Fuse FS is blown when an overcurrent flows between S-phase line SL and DC neutral point bus CL2. Fuse FT is electrically connected between T-phase converter 2T and DC neutral point bus CL3. Specifically, fuse FT has one terminal connected to a DC terminal of T-phase converter 2T, and the other terminal connected to a connection point between capacitors C1T and C2T. Fuse FT is blown when an overcurrent flows between T-phase line TL and DC neutral point bus CL3.

Fuse FP1 is electrically connected between DC positive bus PL1 and U-phase inverter 3U. Specifically, fuse FP1 has one terminal connected to a DC terminal of U-phase inverter 3U, and the other terminal connected to a positive-side electrode of capacitor C1U. Fuse FP1 is blown when an overcurrent flows between DC positive bus PL1 and U-phase inverter 3U. Fuse FN1 is electrically connected between DC negative bus NL1 and U-phase inverter 3U. Specifically, fuse FN1 has one terminal connected to a DC terminal of U-phase inverter 3U, and the other terminal connected to a negative-side electrode of capacitor C2U.

Fuse FN1 is blown when an overcurrent flows between DC negative bus NL1 and U-phase inverter 3U. Fuse FC1 is electrically connected between DC neutral point bus CL1 and U-phase inverter 3U. Specifically, fuse FC1 has one terminal connected to a DC terminal of U-phase inverter 3U, and the other terminal connected to a connection point between capacitors C1U and C2U. Fuse FC1 is blown when an overcurrent flows between DC neutral point bus CL1 and U-phase inverter 3U.

Fuse FP2 is connected between DC positive bus PL2 and V-phase inverter 3V. Specifically, fuse FP2 has one terminal connected to a DC terminal of V-phase inverter 3V, and the other terminal connected to a positive-side electrode of capacitor C1V. Fuse FP2 is blown when an overcurrent flows between DC positive bus PL2 and V-phase inverter 3V. Fuse FN2 is electrically connected between DC negative bus NL2 and V-phase inverter 3V. Specifically, fuse FN2 has one terminal connected to a DC terminal of V-phase inverter 3V, and the other terminal connected to a negative-side electrode of capacitor C2V. Fuse FN2 is blown when an overcurrent flows between DC negative bus NL2 and V-phase inverter 3V. Fuse FC2 is electrically connected between DC neutral point bus CL2 and V-phase inverter 3V. Specifically, fuse FC2 has one terminal connected to a DC terminal of V-phase inverter 3V, and the other terminal connected to a connection point between capacitors C1V and C2V. Fuse FC2 is blown when an overcurrent flows between DC neutral point bus CL2 and V-phase inverter 3V.

Fuse FP3 is connected between DC positive bus PL3 and W-phase inverter 3W. Specifically, fuse FP3 has one terminal connected to a DC terminal of W-phase inverter 3W, and the other terminal connected to a positive-side electrode of capacitor C1W. Fuse FP3 is blown when an overcurrent flows between DC positive bus PL3 and W-phase inverter 3W. Fuse FN3 is electrically connected between DC negative bus NL3 and W-phase inverter 3W. Specifically, fuse FN3 has one terminal connected to a DC terminal of W-phase inverter 3W, and the other terminal connected to a negative-side electrode of capacitor C2W. Fuse FN3 is blown when an overcurrent flows between DC negative bus NL3 and W-phase inverter 3W. Fuse FC3 is electrically connected between DC neutral point bus CL3 and W-phase inverter 3W. Specifically, fuse FC3 has one terminal connected to a DC terminal of W-phase inverter 3W, and the other terminal connected to a connection point between capacitors C1W and C2W. Fuse FC3 is blown when an overcurrent flows between DC neutral point bus CL3 and W-phase inverter 3W.

Figure 2:
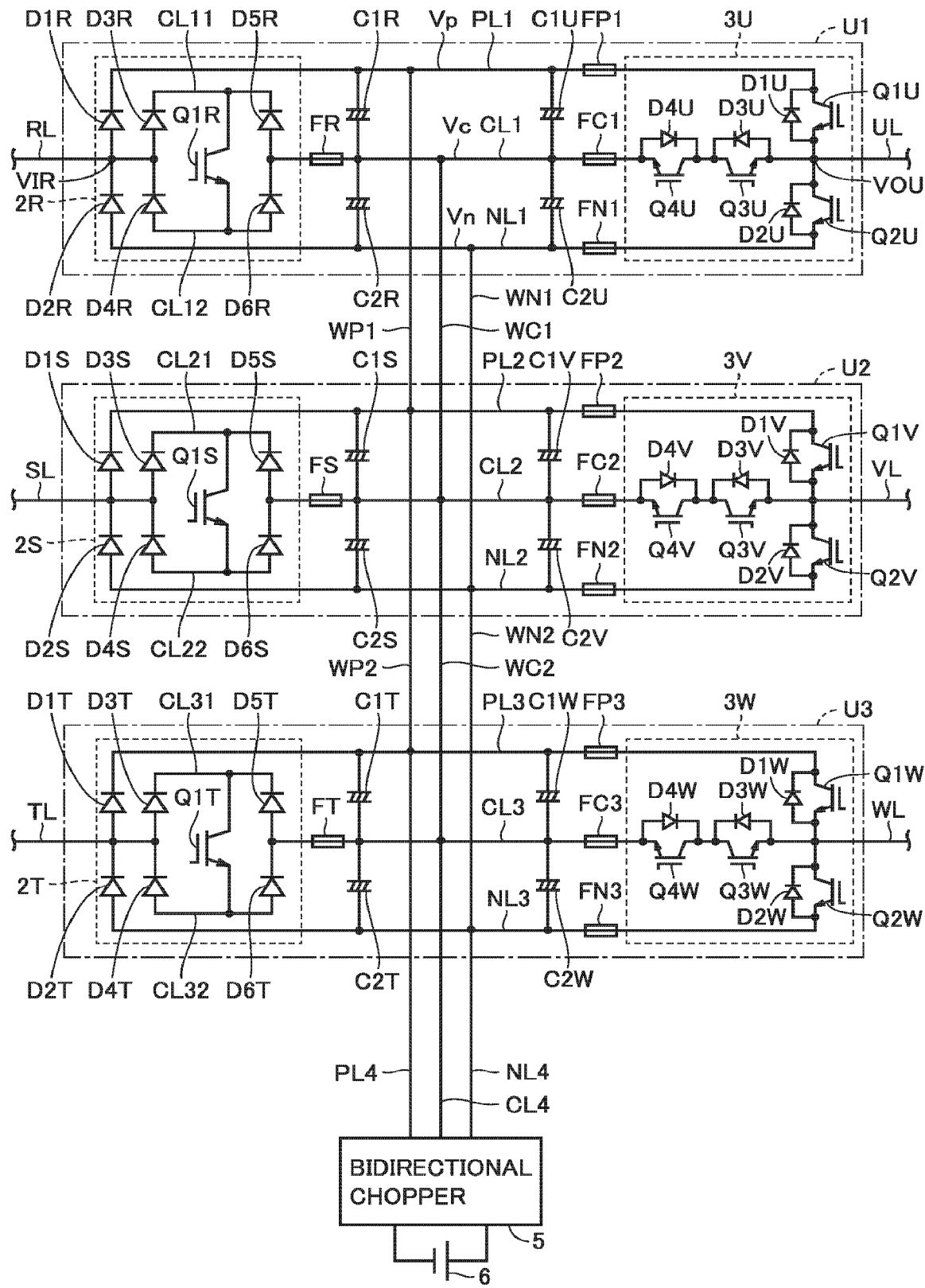
FIG. 2 is a circuit diagram illustrating exemplary configurations of single-phase converters 2R, 2S, and 2T and single-phase inverters 3U, 3V, and 3W shown in FIG. 1.

FIG. 2 is a circuit diagram illustrating exemplary configurations of single-phase converters 2R, 2S, and 2T and single-phase inverters 3U, 3V, and 3W shown in FIG. 1.

Referring to FIG. 2, R-phase converter 2R includes an IGBT element Q1R and diodes D1R to D6R. S-phase converter 2S includes an IGBT element Q1S and diodes D1S to D6S. T-phase converter 2T includes an IGBT element Q1T and diodes D1T to D6T. U-phase inverter 3U includes IGBT elements Q1U to Q4U and diodes D1U to D4U. V-phase inverter 3V includes IGBT elements Q1V to Q4V and diodes D1V to D4V. W-phase inverter 3W includes IGBT elements Q1W to Q4W and diodes D1W to D4W. It should be noted that, although an IGBT element is used as a semiconductor switching element in FIG. 2, the semiconductor switching element is not limited thereto, and another semiconductor switching element such as a MOSFET, for example, may be used.

Here, in order to collectively describe the configuration of single-phase converters 2R, 2S, and 2T, reference characters R, S, and T will also be collectively designated by a reference character "x". In order to collectively describe the configuration of single-phase inverters 3U, 3V, and 3W, reference characters U, V, and W will be collectively designated by a reference character "y". DC positive buses PL1, PL2, and PL3 will be collectively designated by "PLi", DC negative buses NL1, NL2, and NL3 will be collectively designated by "NLi", and DC neutral point buses CL1, CL2, and CL3 will be collectively designated by "CLi".

A single-phase converter 2x is a diode rectifier having a neutral point switch. Specifically, single-phase converter 2x includes diodes D1x and D2x, a bridge circuit composed of diodes D3x to D6x (a diode bridge), and an IGBT element Q1x.

Diode D1x has a cathode connected to a DC positive bus PLi, and an anode connected to an x-phase line xL. Diode D2x has a cathode connected to x-phase line xL, and an anode connected to a DC negative bus NLi. In the diode bridge, an anode of diode D3x and a cathode of diode D4x are connected to x-phase line xL, and an anode of diode D5x and a cathode of diode D6x are connected to a DC neutral point bus CLi. IGBT element Q1x has an emitter connected to a cathode of diode D3x and a cathode of diode D5x, and a collector connected to an anode of diode D4x and an anode of diode D6x.

Diodes D1x and D2x constitute a diode rectifier. The diode bridge and IGBT element Q1x constitute an AC switch. The AC switch functions as the neutral point switch. IGBT element Q1x is turned on/off in synchronization with the three-phase AC voltage supplied from AC power supply 1. The AC switch corresponds to one embodiment of a "first AC switch".

The first AC switch is electrically connected between x-phase line xL and DC neutral point bus CLi, and is configured to electrically connect or cut off x-phase line xL and DC neutral point bus CLi. That is, the first AC switch functions as the "neutral point switch".

A fuse Fx is electrically connected between the first AC switch (neutral point switch) and DC neutral point bus CLi. Fuse Fx corresponds to one embodiment of a "first fuse". Fuse Fx is connected between the first AC switch and a connection point between capacitors C1x and C2x connected in series.

In each of single-phase inverters 3U, 3V, and 3W, an IGBT element Q1y has an emitter connected to a y-phase line yL, and a collector connected to DC positive bus PLi. An IGBT element Q2y has a collector connected to y-phase line yL, and an emitter connected to DC negative bus NLi. An IGBT element Q3y has an emitter connected to y-phase line yL, and a collector connected to a collector of an IGBT element Q4y. IGBT element Q4y has an emitter connected to DC neutral point bus CLi. Diodes D1y and D2y function as reflux diodes, and diodes D3y and D4y function as clamp diodes. IGBT elements Q3y and Q4y and diodes D3y and D4y constitute an AC switch. The AC switch corresponds to one embodiment of a "second AC switch".

A fuse FP is connected between the collector of IGBT element Q1y and a positive-side electrode of a capacitor C1y. A fuse FN is connected between the emitter of IGBT element Q2y and a negative-side electrode of a capacitor C2y. A fuse FC is connected between the AC switch and a connection point between capacitors C1y and C2y.

Figure 3:
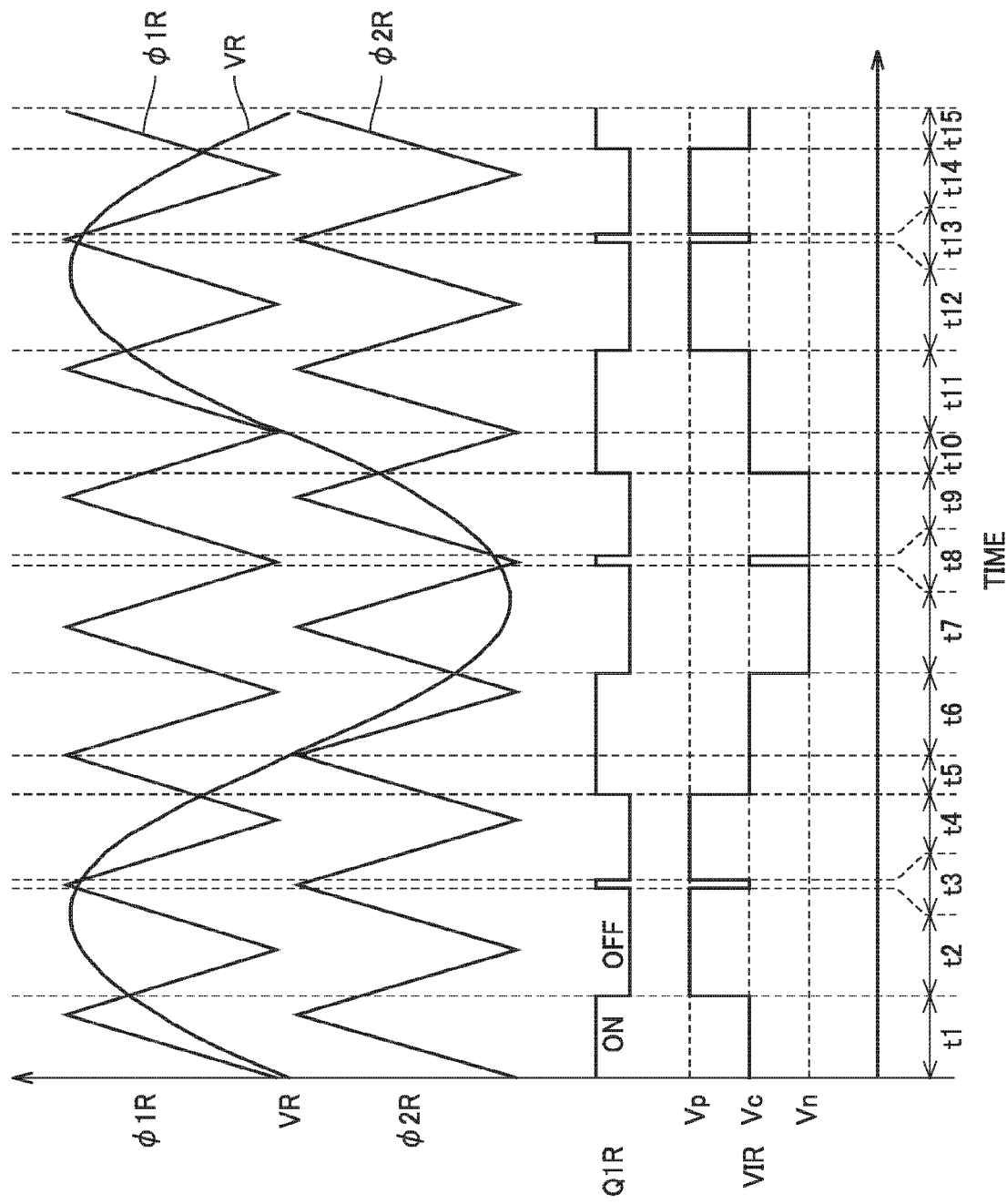
FIG. 3 is a waveform diagram showing the relation between an R-phase voltage VR and ON/OFF of an IGBT element Q1R.
Figure 4:
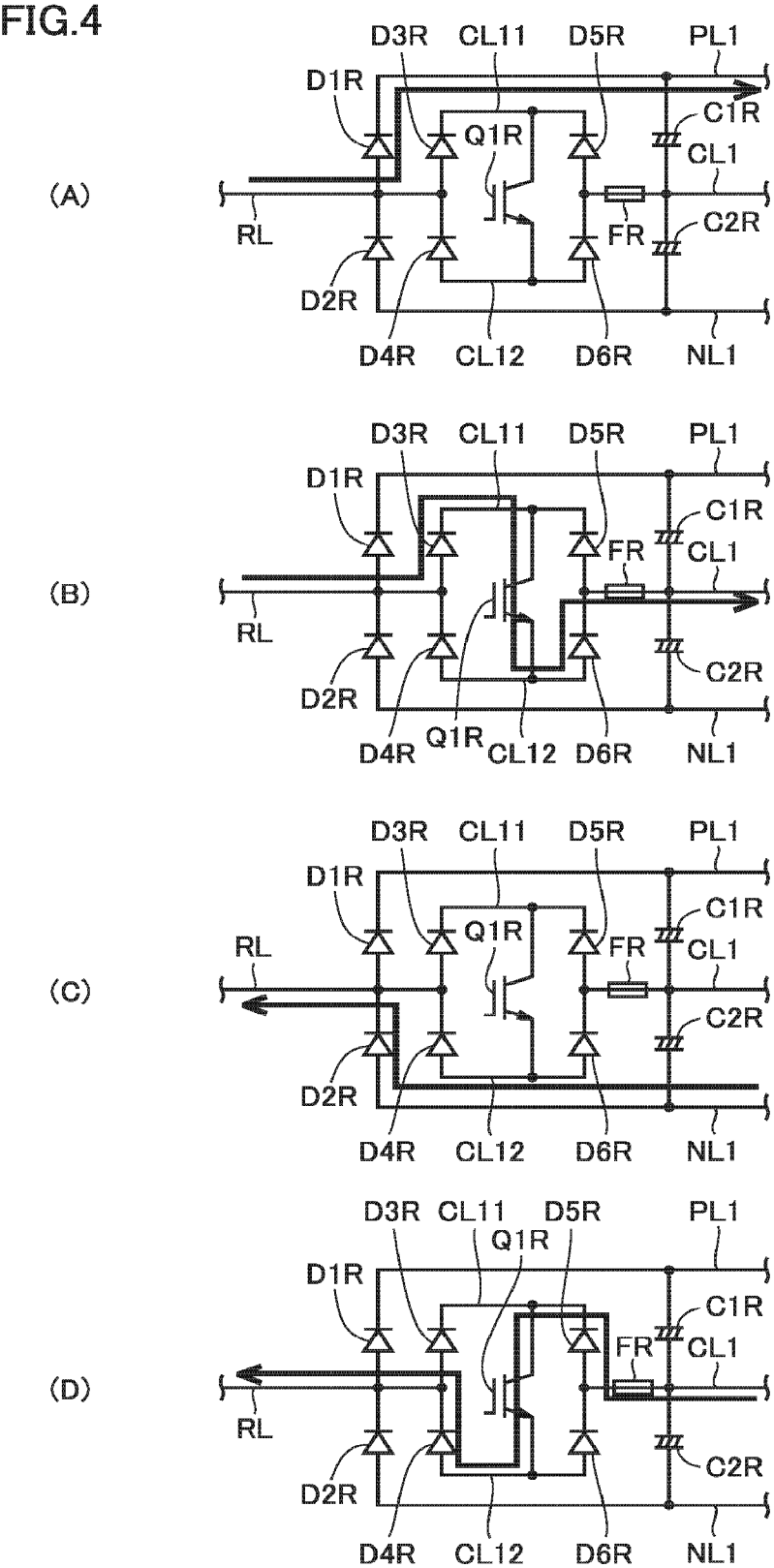
FIG. 4 is a circuit diagram showing operation of an R-phase converter.

Next, operation of single-phase converters 2R, 2S, and 2T will be described using FIGS. 3 and 4. FIG. 3 is a waveform diagram showing the relation between R-phase voltage VR and ON/OFF of IGBT element Q1R. FIG. 4 is a circuit diagram showing operation of the R-phase converter.

Referring to FIG. 3, levels of R-phase voltage VR and reference signals 41R and φ2R are compared, and combination of ON/OFF of IGBT element Q1R is determined based on the result of comparison.

Reference signals φ1R and φ2R are each a triangular wave signal which has a frequency five times that of R-phase voltage VR and is synchronized with R-phase voltage VR. Reference signal φ2R is a triangular wave signal in phase with reference signal φ1R.

During periods in which the level of R-phase voltage VR is between the levels of reference signals φ1R and φ2R (t1, t3, t5, t6, t8, t10, t11, t13, t15), IGBT element Q1R is turned on. In this case, during periods in which R-phase voltage VR is a positive voltage (t1, t3, t5, t11, t13, t15), a current flows from R-phase line RL to DC neutral point bus CL1 through diode D3R, IGBT element Q1R, and diode D6R, as shown in FIG. 4(B). Thus, a voltage VIR of a connection point between R-phase line RL and R-phase converter 2R becomes equal to a voltage of DC neutral point bus CL1 (a neutral point voltage Vc). On the other hand, during periods in which R-phase voltage VR is a negative voltage (periods t6, t8, t10), a current flows from DC neutral point bus CL1 to R-phase line RL through diode DSR, IGBT element Q1R, and diode D4R, as shown in FIG. 4(D). Thus, voltage VIR of the connection point between R-phase line RL and R-phase converter 2R becomes equal to the voltage of DC neutral point bus CL1 (neutral point voltage Vc).

During periods in which R-phase voltage VR is positive and the level of R-phase voltage VR is higher than the levels of reference signals φ1R and φ2R (t2, t4, t12, t14), IGBT element Q1R is turned off. On this occasion, a current flows from R-phase line RL to DC positive bus PL1 through diode D1R, as shown in FIG. 4(A). Thus, voltage VIR of the connection point between R-phase line RL and R-phase converter 2R becomes equal to a voltage of DC positive bus PL1 (a positive voltage Vp).

During periods in which the level of R-phase voltage VR is lower than the levels of reference signals φ1R and φ2R (t7, t9), IGBT element Q1R is turned off. On this occasion, a current flows from DC negative bus NL1 to R-phase line RL through diode D2R, as shown in FIG. 4(C). Thus, voltage VIR of the connection point between R-phase line RL and R-phase converter 2R becomes equal to a voltage of DC negative bus NL1 (a negative voltage Vn).

In this manner, in R-phase converter 2R, IGBT element Q1R is PWM-controlled, and is turned on/off at predetermined timing in synchronization with the R-phase voltage from AC power supply 1. R-phase converter 2R generates positive voltage Vp, neutral point voltage Vc, and negative voltage Vn as DC voltages, based on the R-phase voltage. That is, R-phase converter 2R constitutes a three-level converter. It should be noted that the S-phase circuit and the T-phase circuit also operate similarly to the R-phase circuit.

Next, function of fuses FR, FS, and FT provided on the single-phase converter 2R, 2S, 2T side in power conversion device 100 will be described.

Figure 5:
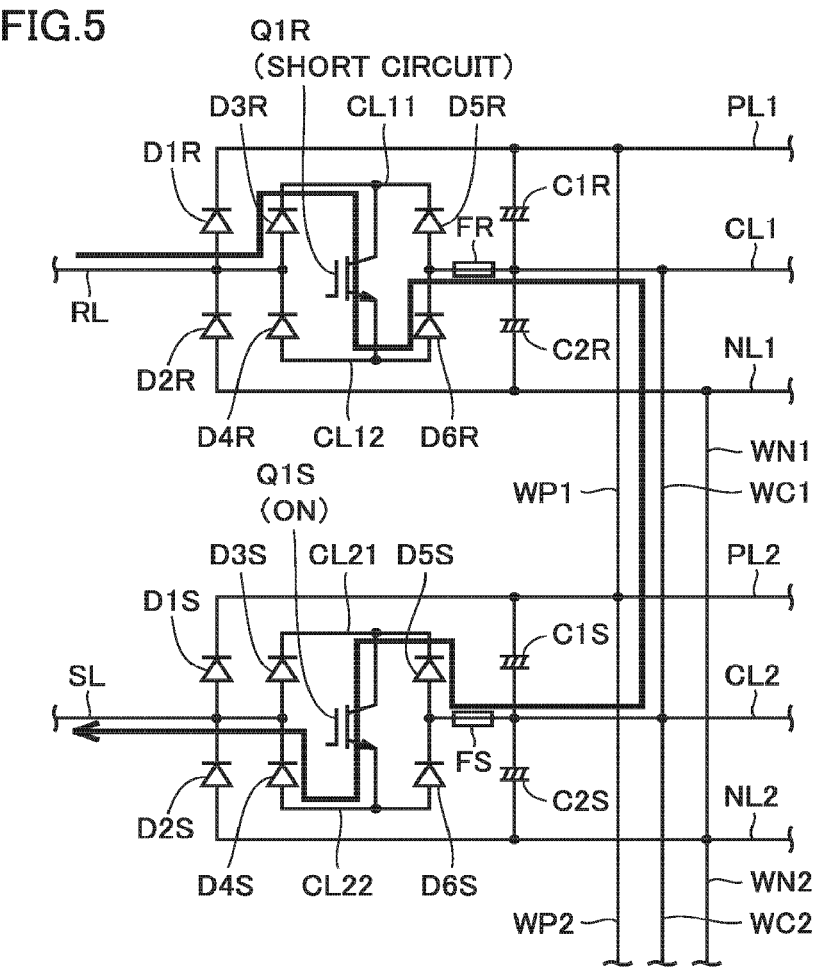

FIG. 5 is a diagram showing a case where IGBT element Q1R has a failure and is short-circuited during a period in which IGBT element Q1S is turned on. In this case, a short-circuit current flows through a path from R-phase line RL to S-phase line SL through diode D3R, IGBT element Q1R, wire WC1, diode DSS, and IGBT element Q1S, as indicated by a solid line arrow in the drawing, and fuses FR and FS are blown. It should be noted that, although the description is given in FIG. 5 taking the R phase and the S phase as an example, the same applies to the T phase.

Next, operation of single-phase inverters 3U, 3V, and 3W will be described.

Figure 6:
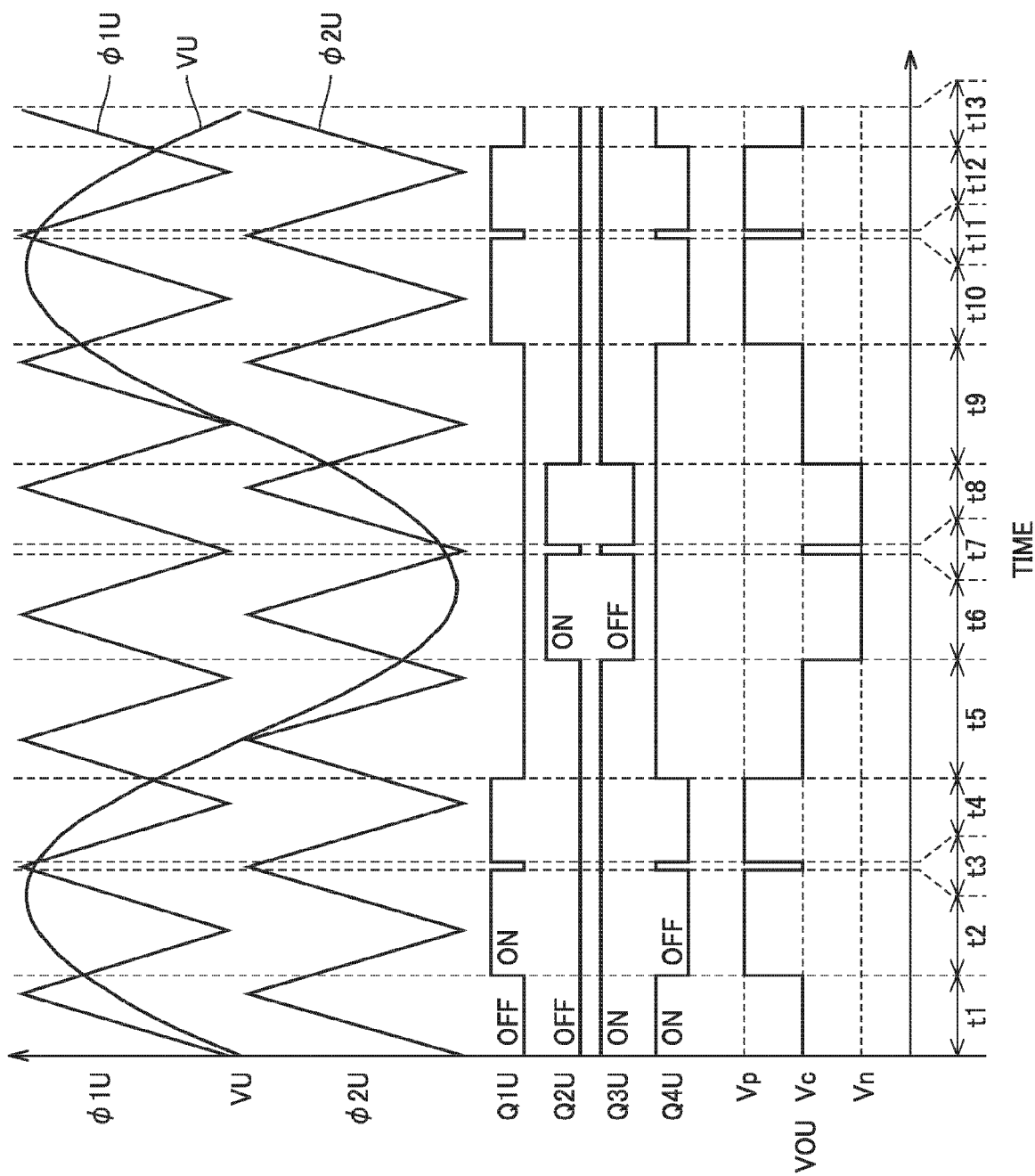
FIG. 6 is a waveform diagram showing the relation between a U-phase voltage VU and ON/OFF of IGBT elements Q1U to Q4U.

FIG. 6 is a waveform diagram showing the relation between U-phase voltage VU and ON/OFF of IGBT elements Q1U to Q4U. U-phase voltage VU is a target voltage of the voltage output from the U-phase line, calculated in control circuit 7 based on the power input from AC power supply 1 to power conversion device 100. Levels of U-phase voltage VU and reference signals ϕ1U and ϕ2U are compared, and combination of ON/OFF of each of IGBT elements Q1U to Q4U is determined based on the result of comparison. As a result, when a voltage of a connection point between U-phase line UL and U-phase inverter 3U is defined as VOU and voltages of DC buses PL1, CL1, and NL1 are defined as Vp, Vc, and Vn, voltage VOU is determined as any of voltages Vp, Vc, and Vn.

Reference signals ϕ1U and ϕ2U are each a triangular wave signal which has a frequency five times that of U-phase voltage VU and is synchronized with U-phase voltage VU. Reference signal 42U is a triangular wave signal in phase with reference signal ϕ1U.

As shown in FIG. 6, during periods in which the level of U-phase voltage VU is between the levels of reference signals ϕ1U and ϕ2U (t1, t3, t5, t7, t9, t11, t13), IGBT elements Q3U and Q4U are turned on, and IGBT elements Q1U and Q2U are turned off. Thus, the voltage of DC neutral point bus CL1 is output from capacitors C1U and C2U to U-phase line UL through IGBT elements Q3U and Q4U. That is, VOU is equal to Vc.

During periods in which the level of U-phase voltage VU is higher than the levels of reference signals ϕ1U and ϕ2U (t2, t4, t10, t12), IGBT elements Q1U and Q3U are turned on, and IGBT elements Q2U and Q4U are turned off. Thus, the voltage of DC positive bus PL1 is output from capacitor C1U to U-phase line UL through IGBT element Q1U. That is, VOU is equal to Vp.

During periods in which the level of U-phase voltage VU is lower than the levels of reference signals ϕ1U and ϕ2U (t6, t8), IGBT elements Q2U and Q4U are turned on, and IGBT elements Q1U and Q3U are turned off. Thus, the voltage of DC negative bus NL1 is output from capacitor C2U to U-phase line UL through IGBT element Q2U. That is, VOU is equal to Vn.

It should be noted that, although operation of U-phase inverter 3U is described herein, V-phase inverter 3V and W-phase inverter 3W also operate similarly to U-phase inverter 3U.

Next, function of fuses FP1, FP2, FP3, FN1, FN2, FN3, FC1, FC2, and FC3 provided on the single-phase inverter 3U, 3V, 3W side in power conversion device 100 will be described.

Figure 7:
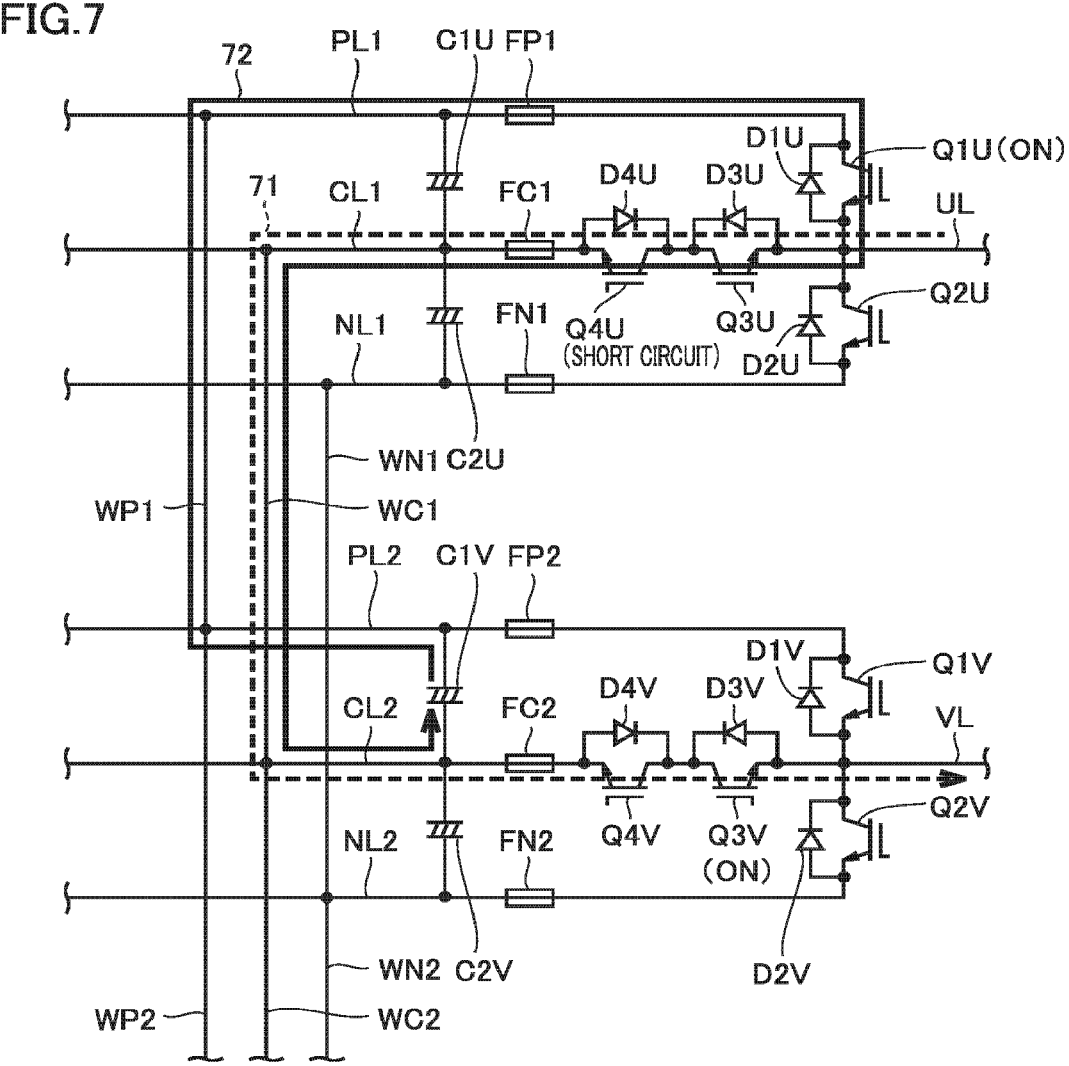

FIG. 7 is a diagram showing a case where IGBT element Q4U has a failure and is short-circuited during a period in which IGBT elements Q1U and Q3V are turned on. In this case, a short-circuit current flows through a path from U-phase line UL to V-phase line VL through diode D3U, IGBT element Q4U, wire WC1, diode D4V, and IGBT element Q3V, as indicated by a broken line arrow 71 in the drawing, and fuses FC1 and FC2 are blown. Further, a short-circuit current flows through a path from a positive-side electrode of capacitor C1V to a negative-side electrode of capacitor C1V through wire WP1, IGBT element Q1U, diode D3U, IGBT element Q4U, and wire WC1, as indicated by a solid line arrow 72 in the drawing, and fuses FP2, FP1, FC1, and FC2 are blown. This can prevent flowing of an overcurrent and occurrence of an overvoltage.

Figure 8:
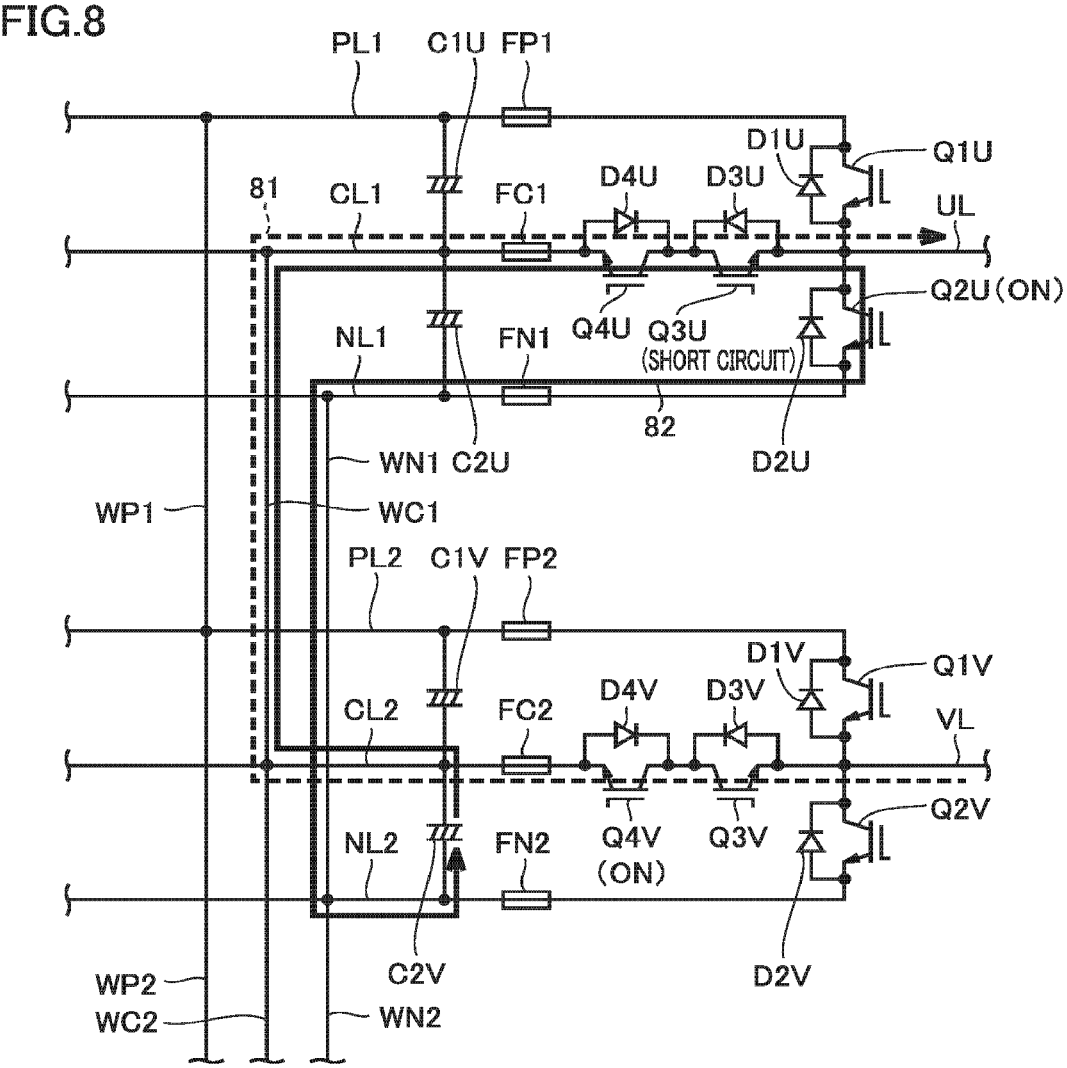

FIG. 8 is a diagram showing a case where IGBT element Q3U has a failure and is short-circuited during a period in which IGBT elements Q2U and Q4V are turned on. In this case, a short-circuit current flows through a path from V-phase line VL to U-phase line UL through diode D3V, IGBT element Q4V, wire WC1, diode D4U, and IGBT element Q3U, as indicated by a broken line arrow 81 in the drawing, and fuses FC2 and FC1 are blown. Further, a short-circuit current flows through a path from a positive-side electrode of capacitor C2V to a negative-side electrode of capacitor C2V through wire WC1, diode D4U, IGBT element Q3U, IGBT element Q2U, and wire WN1, as indicated by a solid line arrow 82, and fuses FC2, FC1, FN1, and FN2 are blown. This can prevent flowing of an overcurrent and occurrence of an overvoltage. It should be noted that, although the description is given in FIGS. 7 and 8 taking the U phase and the V phase as an example, the same applies to the W phase.

[Function and Effect of Present Embodiment]

Next, the function and effect of the power conversion device in accordance with the present embodiment will be described in comparison with a power conversion device in accordance with a comparative example.

Figure 9:
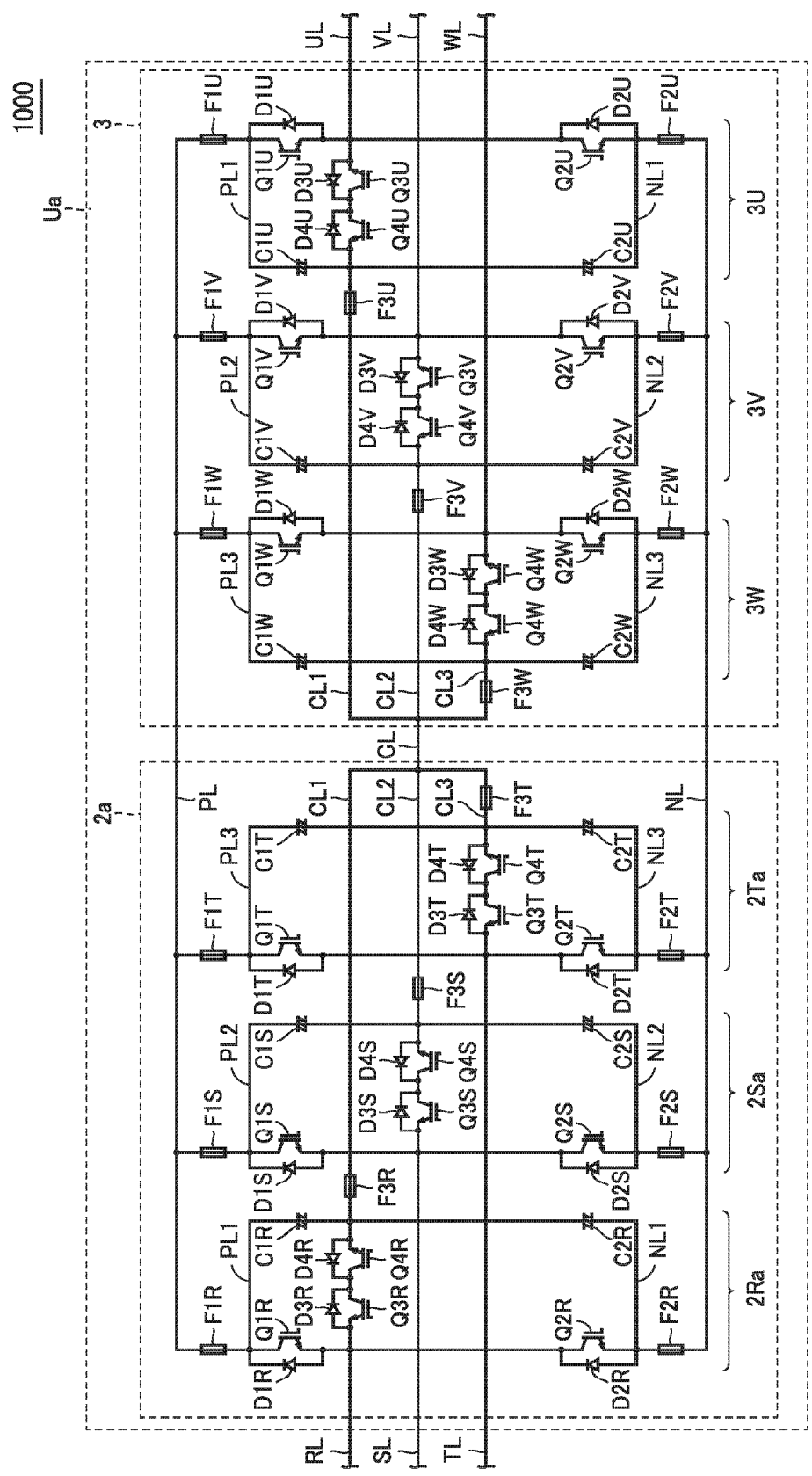
FIG. 9 is a circuit diagram illustrating a configuration of a power conversion device in accordance with a comparative example.

FIG. 9 is a circuit diagram illustrating a configuration of a power conversion device 1000 in accordance with a comparative example. Power conversion device 1000 in accordance with the comparative example corresponds to the power conversion device described in PTL 1 described above. Power conversion device 1000 in accordance with the comparative example is the same as power conversion device 100 in accordance with the present embodiment shown in FIG. 1 in the basic structure constituted of a converter and an inverter, and is different therefrom in the main circuit configuration of the converter and the configuration of a converter unit.

Referring to FIG. 9, power conversion device 1000 in accordance with the comparative example includes one converter unit Ua connected between AC power supply 1 and load 4 (both not shown). Converter unit Ua includes a three-phase converter 2a, a three-phase inverter 3, a DC positive bus PL, a DC negative bus NL, and a DC neutral point bus CL.

Three-phase converter 2a is configured by connecting an R-phase converter 2Ra, an S-phase converter 2Sa, and a T-phase converter 2Ta in parallel between DC positive bus PL and DC negative bus NL. Single-phase converters 2Ra, 2Sa, and 2Ta are configured to have an input/output relation opposite to that of single-phase inverters 3U, 3V, and 3W. The details thereof will be described below.

Referring to FIG. 9, R-phase converter 2Ra includes IGBT elements Q1R to Q4R and diodes D1R to D4R. S-phase converter 2Sa includes IGBT elements Q1S to Q4S and diodes D1S to D4S. T-phase converter 2Ta includes IGBT elements Q1T to Q4T and diodes D1T to D4T.

Here, in order to collectively describe the configuration of single-phase converters 2Ra, 2Sa, and 2Ta, reference characters R, S, and T will be collectively designated by a reference character "xa". Further, DC positive buses PL1, PL2, and PL3 will be collectively designated by "PLi", DC negative buses NL1, NL2, and NL3 will be collectively designated by "NLi", and DC neutral point buses CL1, CL2, and CL3 will be collectively designated by "CU".

An IGBT element Q1xa has an emitter connected to an xa-phase line xaL, and a collector connected to a DC positive bus PLi. An IGBT element Q2xa has a collector connected to xa-phase line xaL, and an emitter connected to a DC negative bus NLi. An IGBT element Q3xa has an emitter connected to xa-phase line xaL, and a collector connected to a collector of an IGBT element Q4xa. IGBT element Q4xa has an emitter connected to a DC neutral point bus CLi. Diodes D1xa and D2xa function as reflux diodes, and diodes D3xa and D4xa function as clamp diodes. IGBT elements Q3xa and Q4xa and diodes D3xa and D4xa constitute an AC switch. In this configuration, the DC neutral point buses of the converters are connected in common to DC neutral point bus CL.

Three-phase inverter 3 is configured by connecting U-phase inverter 3U, V-phase inverter 3V, and W-phase inverter 3W shown in FIGS. 1 and 2 in parallel between DC positive bus PL and DC negative bus NL. In this configuration, the DC neutral point buses of the inverters are connected in common to DC neutral point bus CL.

It should be noted that operation of three-phase inverter 3 is substantially the same as the operation of single-phase inverters 3U, 3V, and 3W illustrated in FIG. 6. Operation of three-phase converter 2a has an input/output relation opposite to that of the operation of single-phase inverters 3U, 3V, and 3W.

Power conversion device 1000 in accordance with the comparative example further includes fuses F1R to F3R, F1S to F3S, F1T to F3T, F1U to F3U, F1V to F3V, and F1W to F3W. In the following, in order to collectively describe the configuration of these fuses, reference characters R, S, T, U, V, and W will be collectively designated by a reference character "z".

A fuse F1z is connected between a collector of an IGBT element Q1z and DC positive bus PL. The collector of IGBT element Q1z is connected with a positive-side electrode of a capacitor C1z. Therefore, fuse F1z is connected between DC positive bus PL and a connection point between IGBT element Q1z and capacitor C1z. A fuse F2z is connected between an emitter of an IGBT element Q2z and DC negative bus NL. The emitter of IGBT element Q2z is connected with a negative-side electrode of a capacitor C2z. Therefore, fuse F2z is connected between DC negative bus NL and a connection point between IGBT element Q2z and capacitor C2z. A fuse F3z is connected between an emitter of an IGBT element Q4z and DC neutral point bus CL. The emitter of IGBT element Q4z is connected with a connection point between capacitors C1z and C2z. Therefore, fuse F3z is connected between DC neutral point bus CL and the connection point between capacitors C1z and C2z.

Thus, in power conversion device 1000 in accordance with the comparative example, each of fuses F1z, F2z, and F3z is connected between a DC bus and a connection point between an IGBT element and a capacitor. In contrast, in power conversion device 100 in accordance with the present embodiment, a fuse is connected between an IGBT element and a capacitor, as shown in FIG. 2.

In power conversion device 1000 in accordance with the comparative example, for example, when IGBT element Q4R has a failure and is short-circuited during a period in which IGBT elements Q1R and Q3S are turned on, a short-circuit current flows through a path from R-phase line RL to S-phase line SL through diode D3R, IGBT element Q4R, fuses F3R and F3S, diode D4S, and IGBT element Q3S, and fuses F3R and F3S are blown. Further, a short-circuit current flows through a path from a positive-side electrode of capacitor C1S to a negative-side electrode of capacitor C1S through fuses F1S and F1R, IGBT element Q1R, diode D3R, IGBT element Q4R, and fuses F3R and F3S, and fuses F1S, F1R, F3R, and F3S are blown.

Thus, also in power conversion device 1000, when an IGBT element has a failure and is short-circuited, fuses are blown and thereby a failed phase is separated from normal phases, preventing flowing of an overcurrent and occurrence of an overvoltage.

On the other hand, in power conversion device 1000, nine fuses are used for each of three-phase inverter 3 and three-phase converter 2a, and thus a total of 18 fuses are used. This may lead to an increase in the size and cost of the power conversion device. Further, when the power conversion device includes many fuses, the total power losses in all the fuses increase during operation of the power conversion device. This may also lead to a reduction in the efficiency of the power conversion device.

In power conversion device 100 in accordance with the present embodiment, each of single-phase converters 2R, 2S, and 2T is constituted of a diode rectifier having a neutral point switch (first AC switch), as shown in FIG. 2.

Here, a short circuit is more likely to occur in an IGBT element due to erroneous switching operation or the like, when compared with a diode which does not require switching operation. In other words, in a diode rectifier having a neutral point switch, although it is a three-level converter, it includes only one IGBT element, which is more likely to be short-circuited than a diode, and thereby a short circuit is less likely to occur therein. Accordingly, using a diode rectifier having a neutral point switch as a converter eliminates a fuse arranged between one terminal of an IGBT element and the DC positive bus and a fuse arranged between one terminal of an IGBT element and the DC negative bus in the comparative example. Therefore, it is possible to decrease the number of fuses with respect to three-level converters to three, as shown in FIGS. 1 to 2. As a result, in power conversion device 100 in accordance with the present embodiment, three fuses for the three-level converter and nine fuses for a three-level inverter, and thus a total of 12 fuses can deal with a short circuit of any of switching elements in the power conversion device, and prevent occurrence of an overcurrent or an overvoltage.

Thus, according to power conversion device 100 in accordance with the present embodiment, a reduction in the size and cost of the power conversion device can be achieved while suppressing occurrence of an overcurrent or an overvoltage. That is, a power conversion device capable of achieving prevention of an overcurrent and an overvoltage with a simple configuration can be provided.

[Variation]

Figure 10:
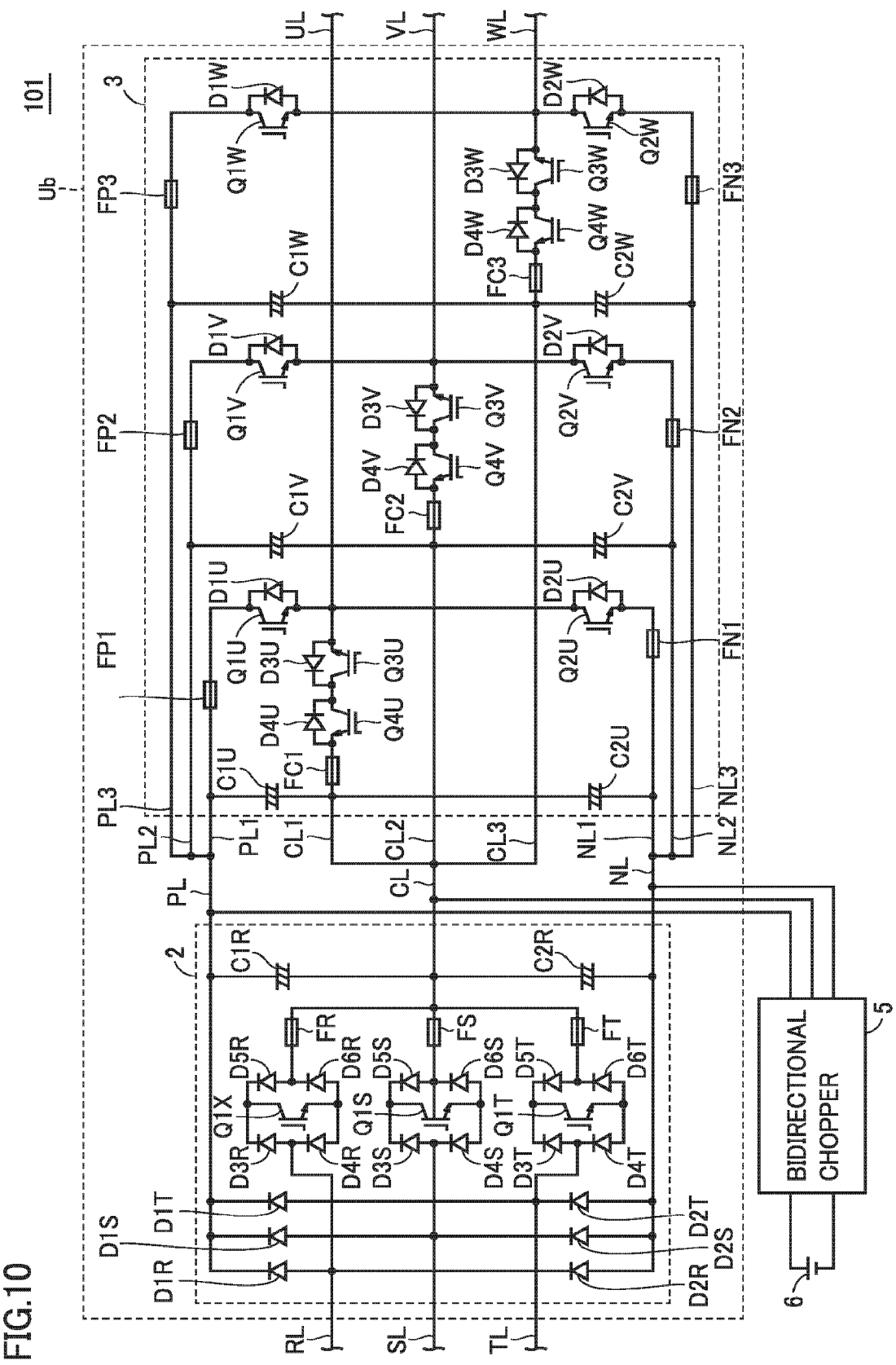
FIG. 10 is a circuit diagram illustrating a configuration of a power conversion device in accordance with a variation of the embodiment of the present invention.

FIG. 10 is a circuit diagram illustrating a configuration of a power conversion device 101 in accordance with a variation of the embodiment of the present invention. Power conversion device 101 in accordance with the present variation is basically the same as power conversion device 100 in accordance with the present embodiment shown in FIGS. 1 and 2 in the main circuit configurations of a converter and an inverter and the basic structure constituted of the converter and the inverter, and is different therefrom in the configuration of a converter unit.

Referring to FIG. 10, power conversion device 101 in accordance with the present variation includes one converter unit Ub connected between AC power supply 1 and load 4 (both not shown). Converter unit Ub includes three-phase converter 2, three-phase inverter 3, DC positive bus PL, DC negative bus NL, and DC neutral point bus CL.

Three-phase converter 2 is configured by connecting R-phase converter 2R, S-phase converter 2S, and T-phase converter 2T shown in FIGS. 1 and 2 in parallel between DC positive bus PL and DC negative bus NL. In this configuration, the DC neutral point buses of the converters are connected in common to DC neutral point bus CL.

Three-phase inverter 3 is configured by connecting U-phase inverter 3U, V-phase inverter 3V, and W-phase inverter 3W shown in FIGS. 1 and 2 in parallel between DC positive bus PL and DC negative bus NL. In this configuration, the DC neutral point buses of the inverters are connected in common to DC neutral point bus CL. It should be noted that operations of three-phase converter 2 and three-phase inverter 3 are substantially the same as the operations of single-phase converters 2R, 2S, and 2T and single-phase inverters 3U, 3V, and 3W illustrated in FIGS. 3 and 6, respectively.

In power conversion device 101 in accordance with the present variation, the total number, inserted positions, and function of fuses FR, FS, FT, FP1, FP2, FP3, FN1, FN2, FN3, FC1, FC2, and FC3 are the same as those in power conversion device 100 in accordance with the embodiment described above.

That is, also in the present variation, when an IGBT element has a failure and is short-circuited in any of the single-phase converters and the single-phase inverters, some of the 12 fuses are blown, and thereby occurrence of an overcurrent or an overvoltage can be prevented. Thus, the present variation can also achieve the same effect as that of the embodiment described above. Since other components are the same as those in the embodiment described above, the description thereof will not be repeated.

It should be noted that, in power conversion devices 100 and 101 in accordance with the present embodiment and the variation, a fuse is connected between an IGBT element and a capacitor, as shown in FIGS. 2 and 10. Thereby, occurrence of an overcurrent and an overvoltage can be prevented more reliably, when compared with power conversion device 1000 (FIG. 9) in accordance with the comparative example in which each fuse is connected between a DC bus and a connection point of an IGBT element and a capacitor.

Figure 11:
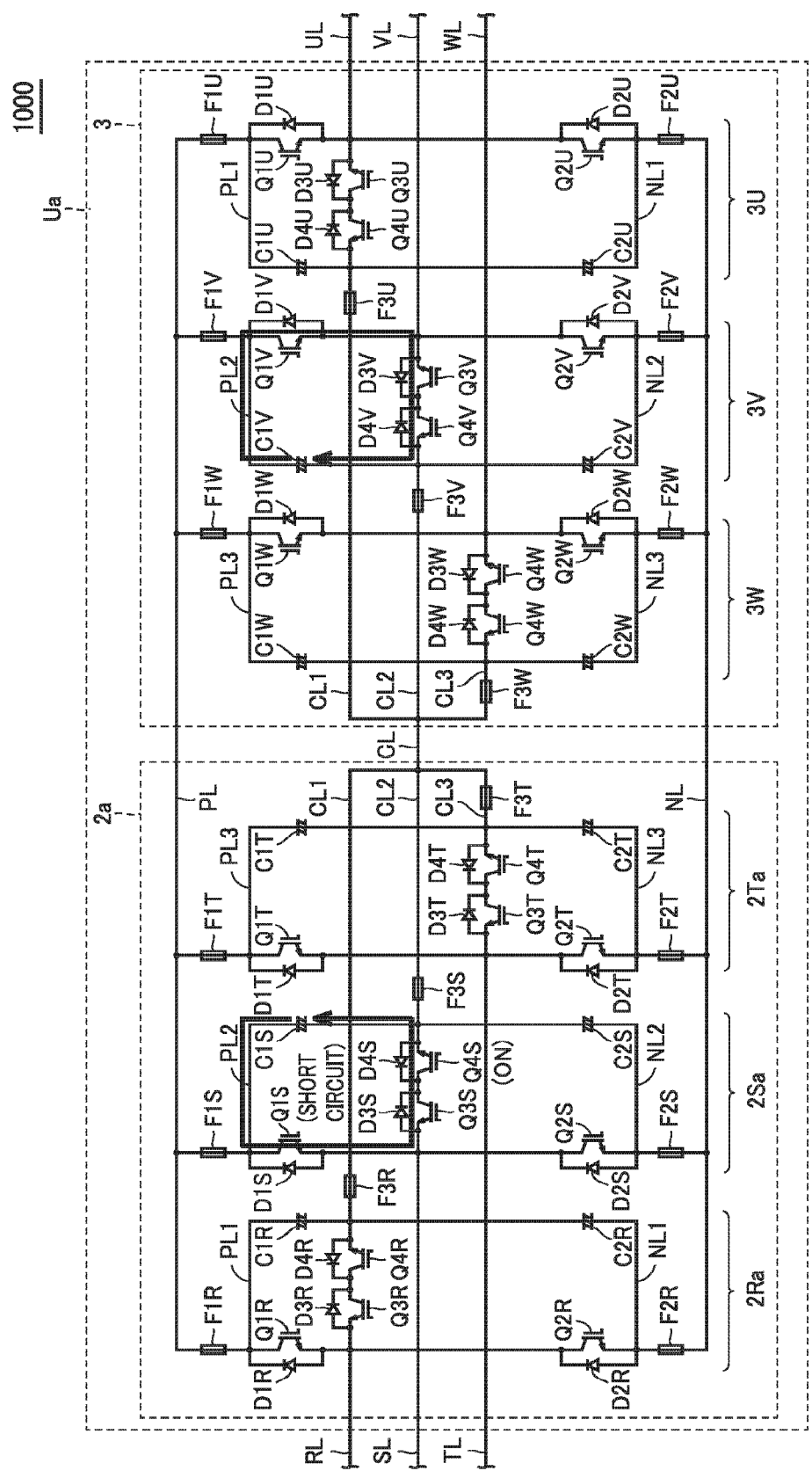
FIG. 11 is a diagram showing a case where an IGBT element has a failure and is short-circuited in the power conversion device in accordance with the comparative example.

FIG. 11 shows a case where IGBT element Q1S of three-phase converter 2a has a failure and is short-circuited in power conversion device 1000 in accordance with the comparative example shown in FIG. 9. In this case, when IGBT element Q4S is turned on, a short-circuit current flows through a path from the positive-side electrode of capacitor C1S to the negative-side electrode of capacitor C1S through IGBT element Q1S, diode D3S, and IGBT element Q4S, as indicated by an arrow in the drawing. However, since no fuse is arranged on the path for the short-circuit current, it is not possible to cut off the path. Such a fault may occur also when an IGBT element of three-phase inverter 3 has a failure and is short-circuited.

Figure 12:
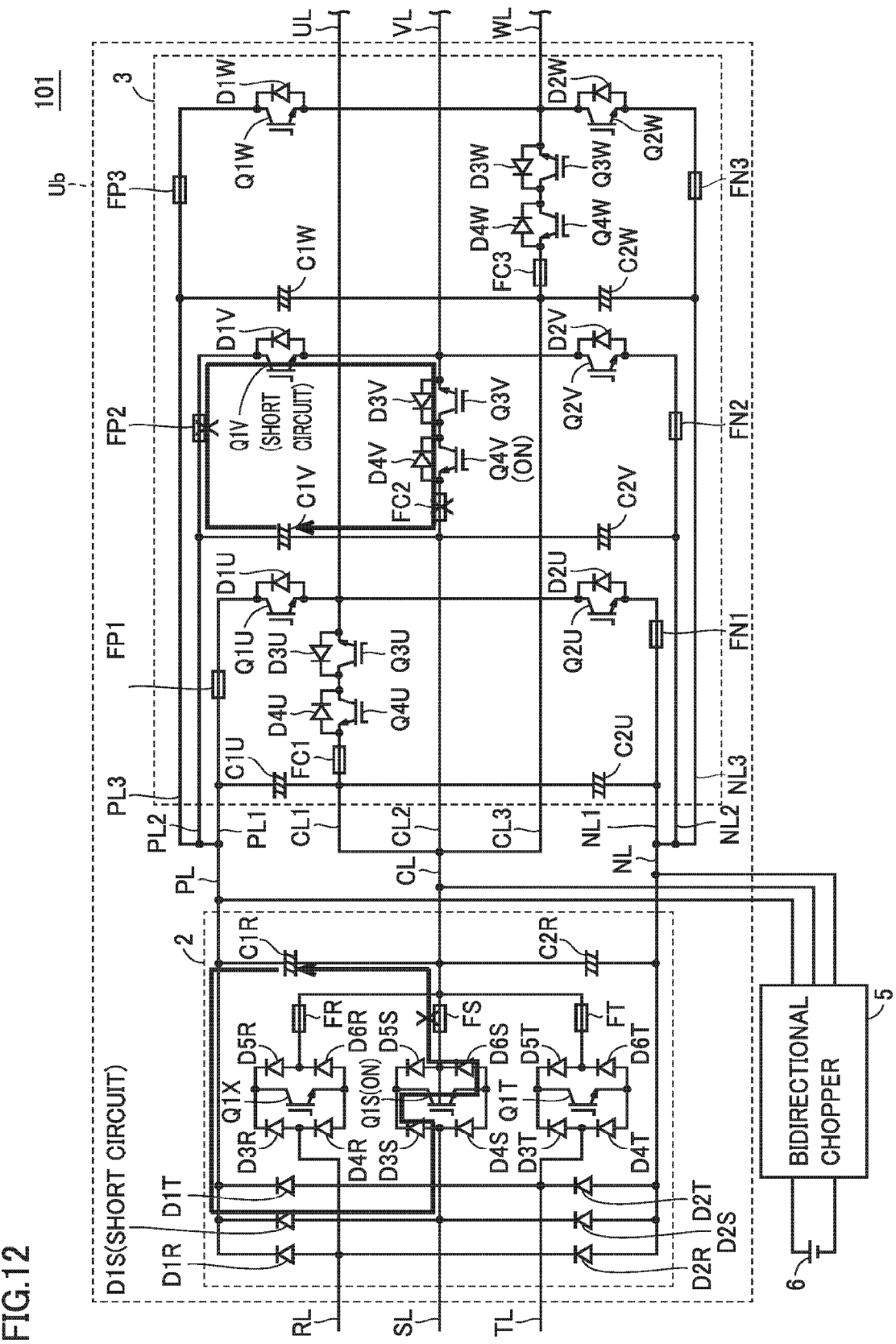
FIG. 12 is a diagram showing a case where an IGBT element has a failure and is short-circuited in the power conversion device in accordance with the embodiment of the present invention.

In contrast, in power conversion device 101 in accordance with the variation of the present embodiment, as shown in FIG. 12, for example when IGBT element Q1S is turned on in a case where IGBT element D1S of three-phase converter 2 has a failure and is short-circuited, a short-circuit current flows through a path from a positive-side electrode of capacitor C1R to a negative-side electrode of capacitor C1R through diodes D1S and D3S, IGBT element Q1S, and diode D6S, as indicated by an arrow in the drawing. However, since fuse FS is arranged on the path for the short-circuit current, fuse FS is blown and thereby an overcurrent and an overvoltage can be prevented.

Also in three-phase inverter 3, when IGBT element Q4V is turned on in a case where IGBT element Q1V has a failure and is short-circuited, a short-circuit current flows through a path from a positive-side electrode of capacitor C1V to a negative-side electrode of capacitor C1V through IGBT element Q1V, diode D3V, and IGBT element Q4V, as indicated by an arrow in the drawing. However, since fuses FP2 and FC2 are arranged on the path for the short-circuit current, at least one of fuses FP2 and FC2 is blown and thereby an overcurrent and an overvoltage can be prevented.

In the embodiment and the variation thereof described above, three-phase converter 2 (R-phase converter 2R, S-phase converter 2S, T-phase converter 2T) corresponds to one embodiment of a "converter" in the present invention. DC positive bus PL1, PL2, PL3, PL corresponds to a "DC positive bus" in the present invention, DC negative bus NL1, NL2, NL3, NL corresponds to a "DC negative bus" in the present invention, and DC neutral point bus CL1, CL2, CL3, CL corresponds to a "DC neutral point bus" in the present invention.

The diode bridge composed of diodes D3$x$ to D6$x$ and IGBT element Q1$x$ correspond to one embodiment of a "first AC switch" in the present invention. Fuse FR, FS, FT corresponds to a "first fuse" in the present invention.

Three-phase inverter 3 (U-phase inverter 3U, V-phase inverter 3V, W-phase inverter 3W) corresponds to one embodiment of an "inverter" in the present invention. Fuse FP1, FP2, FP3 corresponds to a "second fuse" in the present invention, fuse FN1, FN2, FN3 corresponds to a "third fuse" in the present invention, and fuse FC1, FC2, FC3 corresponds to a "fourth fuse" in the present invention.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: AC power supply; 2, 2a: three-phase converter; 2R, 2Ra, 2S, 2Sa, 2T, 2Ta: single-phase converter; 3: three-phase inverter; 3U, 3V, 3W: single-phase inverter; 4: load; 5: bidirectional chopper; 6: DC power supply; 7: control circuit; 100, 101: power conversion device; C1R, C1S, C1T, C1U, C1V, C1W, C2R, C2S, C2T, C2U, C2V, C2W: capacitor; PL, PL1 to PL4: DC positive buses; NL, NL1 to NL4: DC negative buses; CL, CL1 to CL4: DC neutral point buses; D1R to D6R, D1S to D6S, D1T to D6T, D1U to D6U, D1V to D6V, D1W to D6W: diodes; FR, FS, FT, FP1 to FP3, FC1 to FC3, FN1 to FN3, F1R to F3R, F1S to F3S, F1T to F3T, F1U to F3U, F1V to F3V, F1W to F3W: fuses; Q1R to Q4R, Q1S to Q4S, Q1T to Q4T, Q1U to Q4U, Q1V to Q4V, Q1W to Q4W: IGBT elements; RL, SL, TL, UL, VL, WL: phase line; Ua: converter unit; U1: first converter unit; U2: second converter unit; U3: third converter unit; WC1, WC2, WN1, WN2, WP1, WP2: wire.

The invention claimed is:

1. A power conversion device comprising:
a DC positive bus, a DC negative bus, and a DC neutral point bus;
a converter that is connected between an AC power supply and the DC positive bus, the DC negative bus, and the DC neutral point bus, and that converts an AC voltage supplied from the AC power supply into a DC voltage;
a first capacitor connected between the DC positive bus and the DC neutral point bus; and
a second capacitor connected between the DC neutral point bus and the DC negative bus, the second capacitor being connected in series with the first capacitor,
the converter including
a diode rectifier connected between the AC power supply and each of the DC positive bus and the DC negative bus, the diode rectifier including a first diode and a second diode connected in series between the DC positive bus and the DC negative bus, and
a first AC switch electrically connected between the AC power supply and the DC neutral point bus,
the power conversion device further comprising a first fuse,
wherein a first series circuit of the first and second diodes and a second series circuit of the first and second capacitors are connected in parallel between the DC positive bus and the DC negative bus,
wherein the first AC switch and the first fuse are connected in series between a first connection point of the first and second diodes and a second connection point of the first and second capacitors.

2. The power conversion device according to claim 1, wherein
the converter converts a three-phase AC voltage supplied from the AC power supply into the DC voltage, and
the first AC switch and the first fuse are electrically connected in series between an AC line of each phase voltage of the three-phase AC voltage and the second connection point between the first and second capacitors.

3. The power conversion device according to claim 1, wherein the first AC switch has a diode bridge and a single semiconductor switching element.

4. The power conversion device according to claim 1, further comprising:
an inverter that is connected between a load and the DC positive bus, the DC negative bus, and the DC neutral point bus, and that converts the DC voltage into an AC voltage and supplies the AC voltage to the load, the inverter including
a first semiconductor switching element electrically connected between the DC positive bus and the load,
a second semiconductor switching element electrically connected between the DC negative bus and the load,
a second AC switch electrically connected between the DC neutral point bus and the load,
a third capacitor connected between the DC positive bus and the DC neutral point bus, and
a fourth capacitor connected between the DC neutral point bus and the DC negative bus;
a second fuse connected between the third capacitor and the first semiconductor switching element;
a third fuse connected between the fourth capacitor and the second semiconductor switching element; and
a fourth fuse connected between the second AC switch and a connection point between the third and fourth capacitors.

5. The power conversion device according to claim 2, wherein the first AC switch has a diode bridge and a single semiconductor switching element.

6. The power conversion device according to claim 2, further comprising:
an inverter that is connected between a load and the DC positive bus, the DC negative bus, and the DC neutral point bus, and that converts the DC voltage into an AC voltage and supplies the AC voltage to the load, the inverter including
a first semiconductor switching element electrically connected between the DC positive bus and the load,
a second semiconductor switching element electrically connected between the DC negative bus and the load,
a second AC switch electrically connected between the DC neutral point bus and the load,
a third capacitor connected between the DC positive bus and the DC neutral point bus, and
a fourth capacitor connected between the DC neutral point bus and the DC negative bus;
a second fuse connected between the third capacitor and the first semiconductor switching element;
a third fuse connected between the fourth capacitor and the second semiconductor switching element; and
a fourth fuse connected between the second AC switch and a connection point between the third and fourth capacitors.

7. The power conversion device according to claim 3, further comprising:
an inverter that is connected between a load and the DC positive bus, the DC negative bus, and the DC neutral point bus, and that converts the DC voltage into an AC voltage and supplies the AC voltage to the load, the inverter including
a first semiconductor switching element electrically connected between the DC positive bus and the load,
a second semiconductor switching element electrically connected between the DC negative bus and the load,
a second AC switch electrically connected between the DC neutral point bus and the load,
a third capacitor connected between the DC positive bus and the DC neutral point bus, and
a fourth capacitor connected between the DC neutral point bus and the DC negative bus;
a second fuse connected between the third capacitor and the first semiconductor switching element;
a third fuse connected between the fourth capacitor and the second semiconductor switching element; and
a fourth fuse connected between the second AC switch and a connection point between the third and fourth capacitors.

8. The power conversion device according to claim 5, further comprising:
an inverter that is connected between a load and the DC positive bus, the DC negative bus, and the DC neutral point bus, and that converts the DC voltage into an AC voltage and supplies the AC voltage to the load, the inverter including
a first semiconductor switching element electrically connected between the DC positive bus and the load,
a second semiconductor switching element electrically connected between the DC negative bus and the load,
a second AC switch electrically connected between the DC neutral point bus and the load,
a third capacitor connected between the DC positive bus and the DC neutral point bus, and
a fourth capacitor connected between the DC neutral point bus and the DC negative bus;
a second fuse connected between the third capacitor and the first semiconductor switching element;
a third fuse connected between the fourth capacitor and the second semiconductor switching element; and
a fourth fuse connected between the second AC switch and a connection point between the third and fourth capacitors.

* * * * *